US011216053B2

(12) United States Patent
Seto

(10) Patent No.: US 11,216,053 B2
(45) Date of Patent: Jan. 4, 2022

(54) SYSTEMS, APPARATUS, AND METHODS FOR TRANSITIONING BETWEEN MULTIPLE OPERATING STATES

(71) Applicant: LENOVO (Singapore) PTE. LTD., New Tech Park (SG)

(72) Inventor: Yuichiro Seto, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 17/066,438

(22) Filed: Oct. 8, 2020

(65) Prior Publication Data

US 2021/0141438 A1 May 13, 2021

(30) Foreign Application Priority Data

Nov. 13, 2019 (JP) .............................. JP2019-205466

(51) Int. Cl.
*G06F 1/32* (2019.01)
*G06F 1/24* (2006.01)
*G06F 11/30* (2006.01)
*G06F 1/3228* (2019.01)
*G06F 1/3296* (2019.01)
*G06F 1/3287* (2019.01)

(52) U.S. Cl.
CPC .............. *G06F 1/3228* (2013.01); *G06F 1/24* (2013.01); *G06F 1/3287* (2013.01); *G06F 1/3296* (2013.01); *G06F 11/3062* (2013.01)

(58) Field of Classification Search
CPC .... G06F 1/3228; G06F 1/3287; G06F 1/3296; G06F 1/24; G06F 11/3062
See application file for complete search history.

(56) References Cited

U.S. PATENT DOCUMENTS

| 8,612,786 | B1 * | 12/2013 | Lachwani | G06F 1/324 713/322 |
| 2014/0173314 | A1 * | 6/2014 | Min | G06F 1/3206 713/323 |
| 2020/0103953 | A1 * | 4/2020 | Sadowski | G06F 1/3228 |

FOREIGN PATENT DOCUMENTS

| JP | 2004362027 A | 12/2004 |
| JP | 2008192037 A | 8/2008 |
| JP | 2012068882 A | 4/2012 |
| JP | 2019191413 A | 10/2019 |

* cited by examiner

*Primary Examiner* — Stefan Stoynov
(74) *Attorney, Agent, or Firm* — Kunzler Bean & Adamson

(57) ABSTRACT

Methods that can transition between multiple operating states are disclosed. One method includes monitoring an amount of power consumed by an information handling device operating in an idle state after transitioning from an active state to the idle state, transitioning an operating state of the information handling device to the active state in response to detecting that the amount of power consumed by the information handling device in the idle states exceeds a predetermined power consumption threshold value, and causing the operating state of the information handling device to transition back to the idle state subsequent to transitioning to the active state. Apparatuses and computer program products for performing the method are also disclosed.

20 Claims, 6 Drawing Sheets

SYSTEMS, APPARATUS, AND METHODS FOR TRANSITIONING BETWEEN MULTIPLE OPERATING STATES

REFERENCE TO RELATED APPLICATION

This application claims priority to Japanese Patent Application No. JP2019-205466, filed on Nov. 13, 2019, the contents of which are incorporated herein by reference, in their entirety.

FIELD

The subject matter disclosed herein relates to computing systems and devices and, more particularly, relates to systems, apparatus, and methods for transitioning between multiple operating states.

BACKGROUND

Information processing apparatuses, such as personal computers (PCs), are expected to consume power efficiently. In general, the power consumption of a processor accounts for most of the power consumed by an information processing apparatus. There is an information processing apparatus including a power control mechanism that detects an operating environment and changes from an operating mode in a normal operating state (hereinafter, a standard operating mode) to a sleep mode when the operating environment becomes an operating environment in which a large load is not expected. The sleep mode is an operating mode lower in power consumption than the standard operating mode, which may also be called a low-power consumption mode, a power saving mode, a standby power mode, or the like. In addition, the sleep mode includes an operating mode called a Modern Standby mode. In the Modern Standby mode, the information processing apparatus provides limited predetermined functions and a resume time to change to the standard operating mode that is shorter than the traditional standby mode.

For example, the limited predetermined functions include one-touch login, data synchronization, a voice operation, and the like. The Modern Standby mode may also be called a Connected Standby mode. For example, a processor disclosed in Japanese Unexamined Patent Application Publication No. 2012-068882 includes an application monitoring means for monitoring applications in operation of a processor, a storage means for storing a power status, and a control means for controlling the amount of power consumption of the hardware resources of the processor based on the operating status of the processor and various power information.

BRIEF SUMMARY

Various embodiments provide apparatus, methods, and computer program products that can transition between multiple operating states. One apparatus includes an information handling device that transitions between an active state and an idle state, wherein the idle state includes an operating state lower in power consumption than the active state. The information handling device is configured to monitor an amount of power consumed by the information handling device in the idle state after transitioning from the active state to the idle state, restore the operating state of the information handling device to the active state in response to detecting that the power consumption exceeds a predetermined power consumption threshold value, and cause the operating state of the information handling device to transition back to the idle state again after that.

Methods for an apparatus including an information handling device configured to transition between an active state and an idle state in which the idle state includes an operating state lower in power consumption than the active state are also disclosed. One method includes monitoring an amount of power consumed by the information handling device in the idle state after transitioning from the active state to the idle state, transitioning an operating state of the information handling device to the active state in response to detecting that the amount of power consumed in the idle states exceeds a predetermined power consumption threshold value, and causing the operating state of the information handling device to transition back to the idle state subsequent to transitioning to the active state.

A computer program product for transitioning an operating state of a processor of an information handling device between an active state and an idle state in which the idle state includes an operating state lower in power consumption than the active state are further disclosed. One computer program product includes a computer-readable storage medium including program instructions embodied therewith, the program instructions executable by the processor to cause the processor to monitor an amount of power consumed by the processor in the idle state after transitioning from the active state to the idle state, transition the operating state of the processor to the active state in response to detecting that the amount of power consumed in the idle states exceeds a predetermined power consumption threshold value, and cause the operating state of the processor to transition back to the idle state subsequent to transitioning to the active state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
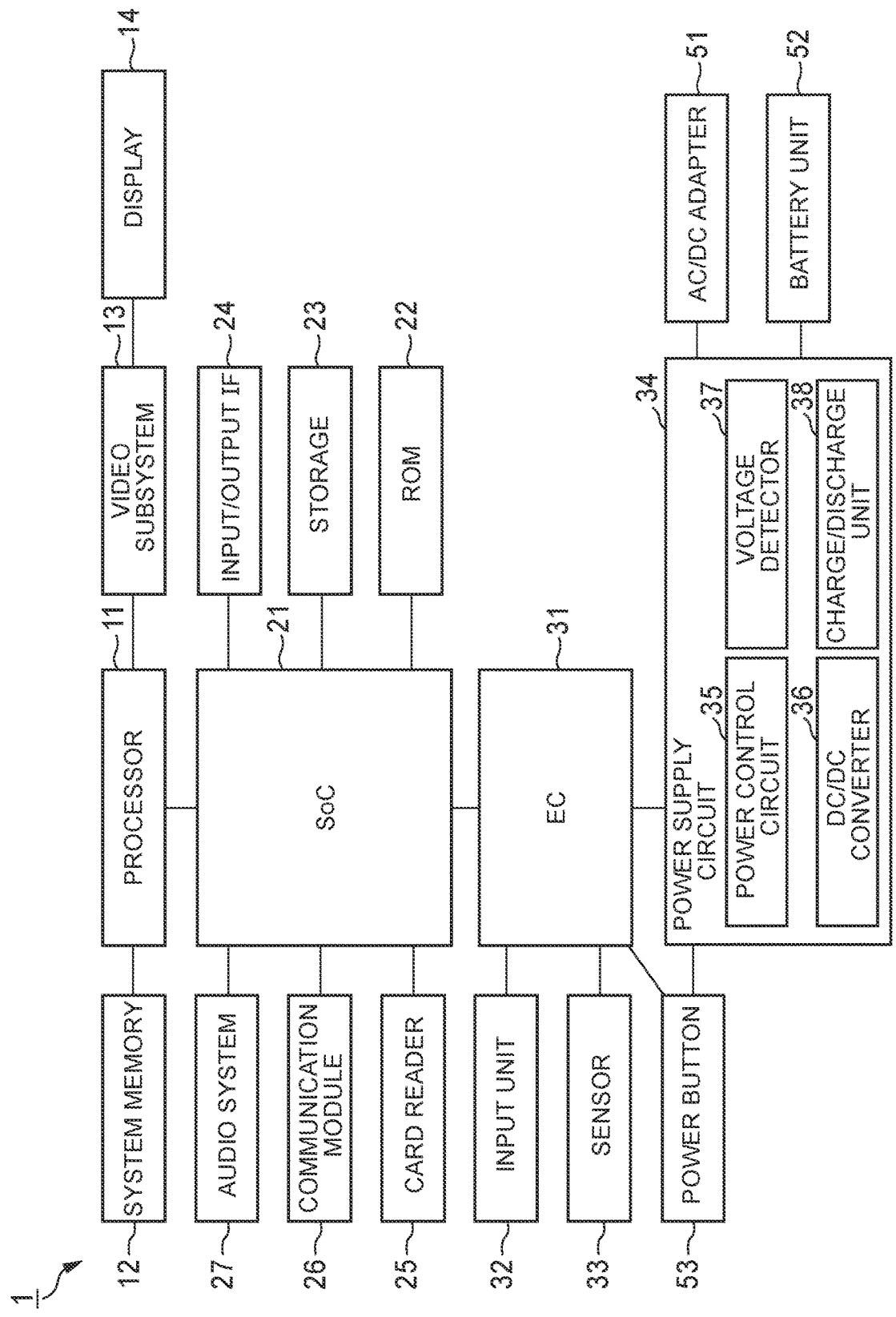
FIG. 1 is a schematic block diagram illustrating one embodiment of a hardware configuration for an information processing apparatus.

As will be appreciated by one skilled in the art, aspects of the embodiments may be embodied as an apparatus and/or a system. Accordingly, embodiments may take the form of an entirely hardware embodiment or an embodiment combining hardware and software aspects that may all generally be referred to herein as a "circuit," "module" or "system."

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present technology solves at least some of the issues discussed above in the Background section. Specifically, there are situations in which the hardware and/or software on a conventional information processing apparatus continues to operate in a standard operating mode instead of switching to the sleep mode. Here, because the amount of power consumed is not reduced when it should otherwise be reduced, conventional information processing apparatus do not use power as efficiently as they could otherwise consume power. The various embodiments disclosed herein provide solutions to at least some power consumption issues. That is, the various embodiments discussed herein can more reliably reduce power consumption compared to conventional information processing apparatus, conventional computing systems, and/or conventional methods for reducing power in information processing apparatuses and/or computing systems.

Various embodiments of the present technology provide an information processing apparatus or an information handling device including a computer system capable of transitioning between an active state and an idle state in which the idle state includes an operating state that consumes less power than the active state. In some embodiments, the information processing apparatus includes a controller that monitors the power consumption of a computer system in the idle state after the transition from the active state to the idle state begins, restores the operating state of the computer system to the active state when power consumption exceeding a predetermined power consumption threshold value is detected, and causes the operating state of the computer system to again transition from the active state to the idle state.

An information processing apparatus, in various embodiments, may further include a display unit and the idle state includes a state in which the display unit stops displaying data (e.g., is turned OFF) and is switchable between a state of executing background processing while the display unit remains OFF and a low-power consumption state capable of switching back to the active state relatively quickly in response to a predetermined active event.

In some embodiments, the information processing apparatus may further include a first chassis, a second chassis, and a sensor that detects a positional relationship between the first chassis and the second chassis. Here, the transition conditions for switching from the active state to the idle state include at least a state in which the first chassis is closed with respect to the second chassis and when the operating state of the computer system is restored to the active state, the controller outputs, to the computer system, a signal indicating whether the first chassis is open with respect to the second chassis or the first chassis remains closed with respect to the second chassis.

In additional or alternative embodiments, the information processing apparatus may include a power supply circuit that supplies power to the information processing apparatus. Here, the controller is configured to monitor the amount of power supplied from the power supply circuit as the power is consumed by the information processing apparatus. In certain embodiments, the controller is configured to transition the information processing apparatus from the active state to the idle state after the lapse of a predetermined amount of time after the information processing apparatus began operating in the active state.

In further additional or alternative embodiments, the above information processing apparatus includes one or more other devices capable of being controlled by the controller. Here, the controller is configured to preset, for each device, a power consumption pattern indicative of a time series of power consumption for each device. Further, at the time an abnormality in one or more power consumption patterns is/are detected and in response thereto, the controller is configured to identify the device(s) that are experiencing an abnormality based on the change in the power consumption pattern that is indicative of the time series of power consumption for the particular device(s). In some embodiments, the controller is configured to restart the device(s) that is/are experiencing an abnormality.

A control method according to various embodiments provides a control method for an information processing apparatus including a computer system capable of transitioning between an active state and an idle state in which the idle state is an operating state that consumes less power than the active state. In some embodiments, the control method includes monitoring the power consumption of the computer system in the idle state after transitioning from the active state to the idle state, transitioning the operating state of the computer system to the active state in response to detecting that the power consumption of the computer systems exceeds a predetermined power consumption threshold value, and transitioning the operating state of the computer system back to the idle state.

Hardware configurations for an information processing apparatus 1 according to various embodiments are described herein with reference to the accompanying drawings. The description of the various embodiments is made with reference to the information processing apparatus 1 including and/or being a laptop personal computer (PC); however, the various embodiments of the present technology are not limited laptop PCs. That is, the various embodiments of an information processing apparatus 1 may be realized in any form including, but not limited to, a desktop PC, a tablet terminal device, and/or a smartphone, etc., among other information processing apparatuses and/or information handling devices that are possible and contemplated herein.

Turning now to the figures, FIG. 1 is a schematic block diagram illustrating one embodiment of a hardware configuration for the information processing apparatus 1. At least in the illustrated embodiment, the information processing apparatus 1 includes, among other components, a processor 11, a system memory 12, a video subsystem 13, a display 14, a System-on-a-Chip (SoC) 21, a Read Only Memory (ROM) 22, a storage 23 (e.g., a computer-readable storage device), an input/output interface (IF) 24, a card reader 25, a communication module 26, an audio system 27, an embedded controller (EC) 31, an input unit 32, a sensor 33, and a power supply circuit 34.

In additional or alternative embodiments, the information processing apparatus 1 includes a principal computer system and a controller. The principle computer system, in various embodiments, includes the processor 11 and the system memory 12. As referred to herein, the principle computer system may be simply referred to as a computer system, a system, or a main system. In certain embodiments, the controller includes the EC 31.

The processor 11, in various embodiments, is configured to perform various arithmetic processing under the control of a program to control the operation of the whole information processing apparatus 1. For example, the processor 11 is composed of one central processing unit (CPU) or a plurality of CPUs (e.g., two or more CPUs).

The system memory 12, in various embodiments, includes a writable memory used as a reading area of a program executed by the processor 11 and/or a working area to write processed data generated by executing the program. In certain embodiments, the system memory 12 include a dynamic random access memory (DRAM) chip or a plurality of DRAM chips (e.g., two or more DRAM chips).

Execution programs or programs include, but are note limited to, for example, an operating system (OS), one or more drivers for controlling the operation of one or more peripheral devices, various service/utility programs (hereinafter, utilities), one or more application programs (hereinafter, applications or apps), and/or the like. As disclosed herein, performing processing directed by a command included in a program may also be called and/or referred to as, executing the program or the execution of the program.

The video subsystem 13, in various embodiments, includes a subsystem to implement functions related to image display. The video subsystem 13 includes, among other components, a video controller.

The video controller in configured to perform processing directed by a drawing command input from the processor 11 and writes display data obtained by the processing to a video memory of the own unit. The video controller reads the written display data from the video memory and, in response thereto, outputs the read display data to the display 14.

The display 14 is configured to display an image based on the display data input from the video subsystem 13. In various embodiments, the display 14 includes, among other components, a liquid crystal display (LCD) or an organic light emitting diode (OLED) display, etc., among other types of displays that are possible and contemplated herein.

The SoC 21 is connected to the processor 11 and is configured to control the input/output of various data using one or more peripheral input/output devices. The SoC 21 includes, among other components, one or more interfaces (e.g., a universal serial bus (USB), a serial advanced technology attachment (SATA), a serial peripheral interface (SPI) bus, a peripheral component interconnect (PCI) bus, a PCI-Express bus, and a low pin count (LPC) bus) configured to connect the devices corresponding to the one or more interfaces. In the embodiment illustrated in FIG. 1, the ROM 22, the storage 23, the input/output IF 24, the card reader 25, the communication module 26, and the audio system 27 are coupled to and/or are in communication with the SoC 21 and correspond to one or more subsystems of the information processing apparatus 1. Further, one or more of the devices directly connected to the SoC 21 may be set as a parent device and the other device(s) may be indirectly connected to the SoC 21 as a child device.

The ROM 22, in various embodiments, includes an electrically rewritable non-volatile memory. For example, system firmware and/or the like for controlling the operation of a Basic Input Output System (BIOS), the EC 31, and/or the like are stored in the ROM 22.

The storage 23 is configured to store various programs and/or data executable by the processor 11. In various embodiments, the storage 23 includes, but is not limited to, for example, a hard disk drive (HDD) and/or a solid state drive (SSD), etc., among other storage devices and/or storage systems that are possible and contemplated herein.

The input/output IF 24, in various embodiments, includes a module capable of inputting/outputting various data in a manner that allows and/or enables the input/output IF 24 to be wired and/or wirelessly connected to one or more other devices. In some embodiments, the input/output IF 24 includes, among other components, a connector for connecting to one or more other devices according to the Thunderbolt® standard as one kind of serial bus standard. The input/output IF 24 may also include a USB connector for connecting to one or more other devices according to the USB standards.

The card reader 25 includes an auxiliary storage device with an attachable and detachable memory card as a recording medium and is configured to read various data from the attached memory card. The card reader 25 may also write various data to the memory card when the memory card is attached to the card reader 25. Note that when the memory card is connected to the card reader 25, the memory card is indirectly coupled to the SoC 21 and the SoC 21 can be a parent device.

The communication module 26 is configured to wired and/or wirelessly connect to a network to send and receive (e.g., communicate) various data to and from one or more other devices connected to the network. In various embodiments, the communication module 26 includes, among other components, a wireless local area network (WLAN) card.

The audio system 27 is configured to input and output audio data. In various embodiments, the audio system 27 includes, among other components, a speaker configured to play back (e.g., transmit) sound according to the audio data input to the audio system 27 and a microphone configured to collect sound arriving at the audio system 27 to acquire audio data.

The EC 31 is configured to monitor the operating environment of the information processing apparatus 1 independently of the processor 11 and the SoC 21 to control the operating state of the information processing apparatus 1. In various embodiments, the EC 31 includes a power management function configured to monitor the operation of the power supply circuit 34 and includes one or more input/output terminals (not illustrated). The input unit 32, the sensor 33, and the power supply circuit 34 are coupled to and/or in communication with the EC 31 via the input/output terminals provided in the EC 31 to control the operation of the power supply circuit 34. The EC 31 is configured to execute the control of the power supply circuit 34 corresponding to the operating state of the information processing apparatus 1. In certain embodiments, the EC 31 includes a microcomputer including its own processor and storage unit.

The EC 31, in some embodiments, is configured to detect the power consumption of the system. After the operating state of the system starts a transition from the active state to the idle state (e.g., in response to the power consumption of the system exceeding a predetermined power consumption threshold value), the EC 31 restores and/or transitions the operating state of the system to the active state. Subsequently, the EC 31 resumes the transition of the operating state of the system to the idle state. The active state is a normal operating mode capable of executing various operations of the information processing apparatus 1. In contrast, the idle state is a low-power consumption mode that consumes less power than the active state. In the idle state, the information processing apparatus 1 is configured to perform some limited functions (e.g., one or more limited functions).

The input unit 32 is configured to accept a user operation, generate an operation signal according to the accepted operation in response thereto, and output the generated operation signal to the EC 31. In certain embodiments, the input unit 32 includes, among other components, a keyboard and/or one or more pointing devices (e.g., a touch pad and/or a mouse, etc., among other pointing devices that are possible and contemplated herein.

The sensor 33 is configured to detect the operating environment of the information processing apparatus 1 and output to the EC 31 a detection signal indicative of the detected operating environment. In various embodiments, the sensor 33 includes, among other components, a sensor configured to detect one or more fluctuating physical quantities in the operating environment caused by a user (e.g., the approach of a user (an approaching state) and/or the like fluctuating physical quantities that can be caused by the user). In embodiments in which the information processing apparatus 1 includes two chassis, the sensor 33 may include a sensor for detecting a fluctuating physical quantity according to the open/close state between the two chassis relative to one another. In the following, the two chassis are called a first chassis 61 and second chassis 62, respectively, to distinguish therebetween.

In various embodiments, the sensor 33 includes, among other components, an infrared sensor, a capacitive sensor, a magnetic sensor, an acceleration sensor, and/or a stress sensor, etc., among other types of sensors that are possible and contemplated herein. The infrared sensor is configured to detect infrared light including a wavelength corresponding to the body temperature of a person to detect the approach of the person, which is based on the intensity of detected infrared light. The capacitive sensor is configured to detect an increased capacitance of a capacitor due to the approach of a person and uses the increased capacitance to determine the approach of the person. The magnetic sensor is installed in one end part of either one of the first chassis 61 and the second chassis 62 and is configured to detect the magnetic field of a permanent magnet installed in one end part of the other chassis. The open/closed state of the first chassis 61 and the second chassis 62 relative to one another is determined depending on the magnitude of the magnetic field. The acceleration sensor is installed in each of the two chassis, respectively, to detect the direction of gravity. An angle formed between the detected two directions of gravity corresponds to an angle formed between the first chassis 61 and the second chassis 62 and this angle is used to determine the open/closed state of the first chassis 61 and the second chassis 62. The stress sensor is configured to detect a stress generated in a hinge unit 63 that couples the first chassis 61 and the second chassis 62 based on the angle between the first chassis 61 and the second chassis 62.

Under the control of the EC 31, the power supply circuit 34 supplies power to each of the devices constituting the information processing apparatus 1 and is configured to adjust the amount of power supplied to the various devices. In various embodiments, the power supply circuit 34 includes, among other components, a power control circuit 35, a Direct Current/Direct Current (DC/DC) converter 36, a voltage detector 37, and/or a charge/discharge unit 38, among other components that are possible and contemplated herein.

A battery storage unit (not illustrated) is provided in a chassis of the information processing apparatus 1 to make a battery unit 52 demountable. A mounting detection line is installed in the information processing apparatus 1 to detect the mounting of the battery unit. The EC 31 can use the mounting detection line to detect whether the battery unit 52 is mounted in the battery storage unit or not.

In some embodiments, the power control circuit 35 is configurable by an Application Specific Integrated Circuit (ASIC). In various embodiments, the ASIC includes, among other components, a logic circuit, a transistor, and/or one or more passive elements (e.g., a register and/or a resistor, etc.), etc., among other components that are possible and contemplated herein. Since the power control circuit 35 is composed only of basic elements without including a processor, the power consumption thereof is relatively low. The voltage detector 37, the DC/DC converter 36, the mounting detection line (not illustrated), and the power button 53 are connected to the power control circuit 35.

In the register of the power control circuit 35, for example, power control information for each operating state of one or more devices is stored. The power control information may include information on one or more devices as a power supply destination. The power control information may also include information on voltage, current, and the like for the device(s). In response to the operating state information indicative of the operating state being input from the SoC 21 or the EC 31, the power control circuit 35 is configured to read, from the register, the power control information corresponding to the operating state indicated in the operating state information and output the read power control information to the DC/DC converter 36. As such, the EC 31 can be configured to use the power control circuit 35 to control the operation of the DC/DC converter 36 according to and/or based the operating mode.

The EC 31 is configured to control the operation of the power supply circuit 34 according to the operating state of the computer system that constitutes the information processing apparatus 1. As operating state indicators, for example, power states defined in the Advanced Configuration and Power Interface (ACPI) specification may be used. In the ACPI specification, an S0 state through an S5 state (e.g., an S0 state, S1 state, S2 state, S3 state, S4 state, and S5 state) are defined as six (6) power states. The S0 state through the S5 state indicate states lower in power consumption or deeper idle states in descending order. A deeper idle state is a state that takes a longer amount of time to transition to and/or resume operating in the active state.

The S0 state is a state corresponding to the active state and is the highest power consuming state among the six power states. The S1 state through the S5 state correspond to different idle states and are indicative of states that are increasingly lower in power consumption or deeper idle states in this order. That is, the S1 state consumes less power than the S0 state and more power than the S2 state, the S2 state consumes less power than the S1 state and more power than the S3 state, the S3 state consumes less power than the S2 state and more power than the S4 state, and the S4 state consumes less power than the S3 state and more power than the S5 state. The S5 state is a state corresponding to the deepest idle state and is the lowest power consuming state among the six power states The system according to various embodiments can take any one or more of the following states: the S0 state corresponding to the active state as the operating state, the Modern Standby mode as an example of an idle state, and the S4 state as an example of a deeper idle state, among each of the various other possibilities of the S0 state through the S5 state and/or the various combinations of the S0 state through the S5 state. In certain embodiments, the EC 31 also supports the S0 state, the Modern Standby mode, and the S4 state. The Modern Standby mode includes an operational state in which the display 14 (e.g., a display unit) stops displaying data, which means an operating state used by switching between an S0ix state in which background processing is executed while the display 14 is OFF and an S0 state (e.g., the active state).

The S0ix state is one form of an idle state lower in power consumption than the S0 state but higher in power consumption than the S1 state, which means an operating state capable of returning to the S0 state faster than a deeper idle state in response to the detection of an active event (to be described later). The background processing means processing executed in the background without any data being displayed on the display 14. The background processing corresponds to, for example, processing the execution of which is not necessarily required to notify the user (e.g., updating various programs and/or the setting of data, etc., among other background operations that are possible and contemplated herein).

In the S0 state, the power supply circuit 34 supplies power to all of the devices physically connected to the information processing apparatus 1. In the S0ix state, the supply of power to the video subsystem 13 and the display 14 may be stopped and/or paused.

In the S4 state, the supply of power to the ROM 22, the storage 23, the card reader 25, the communication module 26, the audio system 27, and the system memory 12 may be stopped and/or paused. Further, the supply of power to the SoC 21, the EC 31, the sensor 33, the power control circuit 35, an Alternating Current/Direct Current (AC/DC) adapter 51, and the battery unit 52 may continue in the S4 state.

The power supply circuit 34 is configured to detect the amount of power supplied to each device as the device(s) consume the power provided thereto. The power supply circuit 34 is further configured to output, to the EC 31, the power consumption information and/or data indicative of the detected power consumption amounts.

Under the control of the power control circuit 35, the DC/DC converter 36 converts the voltage of power supplied from the AC/DC adapter 51 or the battery unit 52 to a voltage required by each respective device of the information processing apparatus 1. The DC/DC converter 36 supplies the converted power to the device as the supply destination indicated by the power control information input from the power control circuit 35. In response to the voltage information for each device being included in the power control information, the DC/DC converter 36 converts the voltage of supplied power to a voltage instructed by the power control information and supplies, to the corresponding device, the particular amount of power with the converted (corresponding) voltage.

The voltage detector 37 is configured to detect the voltage of power supplied from the AC/DC adapter 51 and determines whether the detected voltage is a voltage within a predetermined range. The voltage detector 37 is further configured to output, to the power control circuit 35, a voltage detection signal indicative of whether the detected voltage is a voltage within the predetermined range. Further, the power control circuit 35 is configured to record, in the register, the voltage detection signal input from the voltage detector 37.

The AC/DC adapter 51 is connectable to a power supply terminal provided on the surface of the chassis of the information processing apparatus 1. The AC/DC adapter 51, in some embodiments, is incorporated integrally in the chassis of the information processing apparatus 1.

In certain embodiments, the AC/DC adapter 51 includes one end connected to an outlet of a commercial power supply and the other end connected to the DC/DC converter 36. The AC/DC adapter 51 is configured to convert AC power supplied from the commercial power supply into DC power and supply the converted DC power to the DC/DC converter 36.

In response to the AC/DC adapter 51 not being connected to the information processing apparatus 1, the battery unit 52 uses the charge/discharge unit 38 to supply (or discharge) power accumulated in the information processing apparatus 1 to the DC/DC converter 36. The battery unit 52 also uses the charge/discharge unit 38 to accumulate (or charge) power supplied from the AC/DC adapter 51.

The power button 53 is used by the user to turn ON/OFF the power supply. With this operation, the power button 53 can boot the information processing apparatus 1 from a state in which the operation of the information processing apparatus 1 is completely stopped to an operational state and vice-versa.

The power control circuit 35 is configured to record, in the register, a press-down signal indicative of the power button 53 being actuated (e.g., pressed/depressed, turned ON/OFF, etc.). The EC 31 can refer to the register to determine the presence or absence of the press-down signal. Note that the EC 31 may detect the press-down signal input from the power button 53.

In response to detecting the press-down signal while the information processing apparatus 1 is turned OFF (e.g., the information processing apparatus 1 is being turned ON and/or is booted up), the EC 31 reads the power control information indicative of all of the devices of the information processing apparatus 1 as supply destinations and outputs the power control information to the DC/DC converter 36. After the start of the boot of the information processing apparatus 1 (including the processor 11), the EC 31 erases and/or deletes the press-down signal recorded in the register of the power control circuit 35. Further, in response to detecting the press-down signal during the operation of the information processing apparatus 1 in the normal operating mode, the EC 31 is configured to read the power control information indicative of the stop of the supply of power to all of the devices of the information processing apparatus 1 and output the power control information to the DC/DC converter 36 (e.g., an operational stop, a shutdown operation, and/or turning OFF the information processing apparatus 1).

Figure 2:
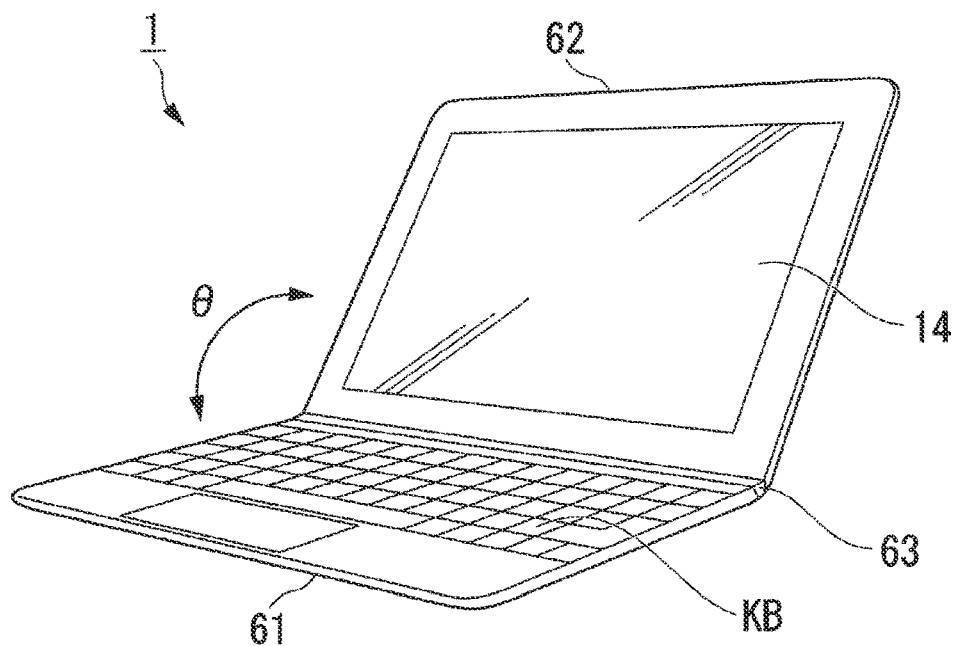
FIG. 2 is a schematic block diagram illustrating an embodiment of an appearance structure of the information processing apparatus illustrated in FIG. 1.

In embodiments in which the information processing apparatus 1 includes a laptop PC, the information processing apparatus 1 includes the first chassis 61, the second chassis 62, and the hinge unit 63, as illustrated in FIG. 2. Here, each of the components other than the AC/DC adapter 51 illustrated in FIG. 1 can be housed in either the first chassis 61 or the second chassis 62. Each of the first chassis 61 and the second chassis 62 includes a generally flat, rectangular shape and includes a thickness that is less than the width and depth thereof.

The hinge unit 63 is engaged along one of the longer sides of the respective main surface of the first chassis 61 and the second chassis 62 and is relatively rotatable around the axis of rotation parallel to the longer sides, which allows and/or enables the open angle θ between the first chassis 61 and the second chassis 62 to be variable. The open angle θ is an angle between the faces of the first chassis 61 and the second chassis 62 that face each other (hereinafter, the inner faces).

In the embodiment illustrated in FIG. 2, a keyboard KB is placed on the inner face of the first chassis 61 and the display 14 is placed on the inner face of the second chassis 62. Under this configuration, use of the information processing apparatus 1 by the user is not expected when the first chassis 61 is closed with respect to the second chassis 62.

Figure 3:
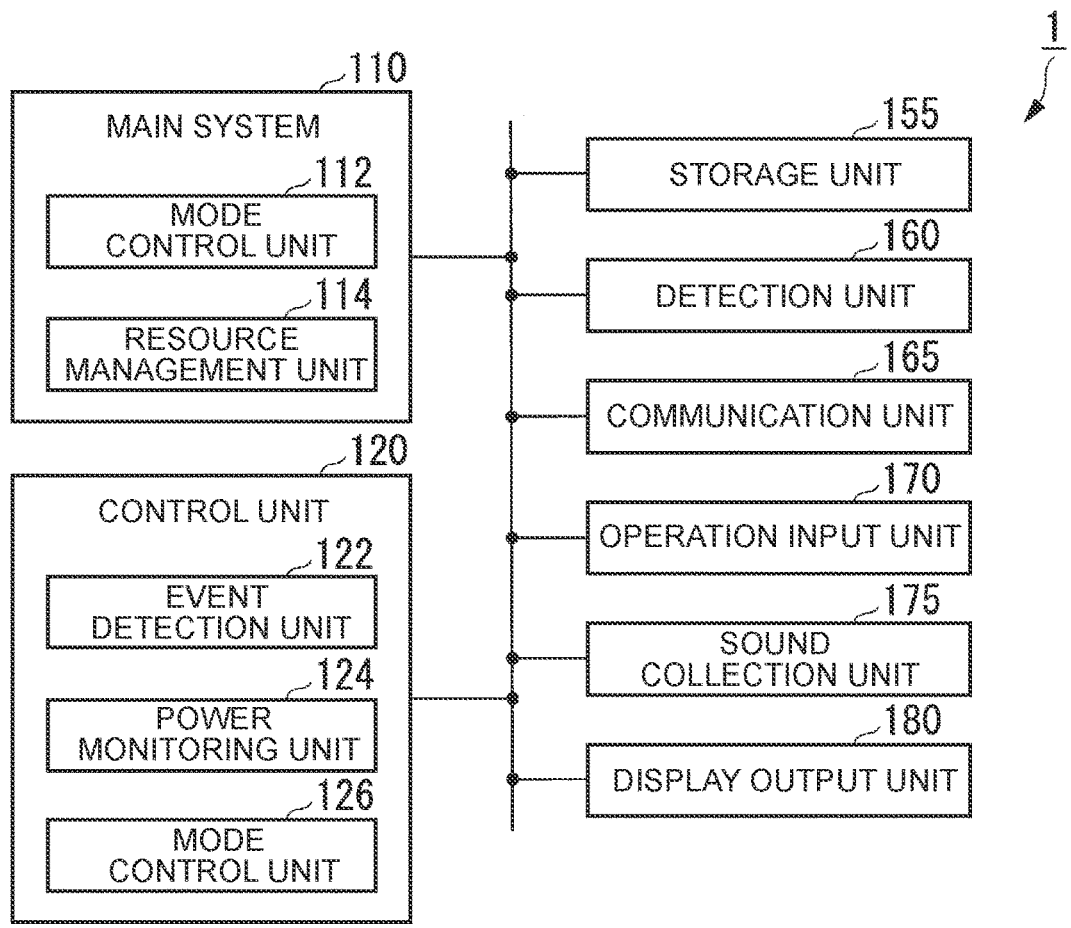
FIG. 3 is a block diagram illustrating one embodiment of a functional configuration for the information processing apparatus illustrated in FIG. 1.

Below, functional configurations of the information processing apparatus 1 according to various embodiments are discussed. FIG. 3 is a block diagram illustrating one embodiment of a functional configuration for the information processing apparatus 1. At least in the illustrated embodiment, the information processing apparatus 1 includes, among other components, a main system 110, a control unit 120, a storage unit 155, a detection unit 160, a communication unit 165, an operation input unit 170, a sound collection unit 175, and a display output unit 180. In FIG. 3, the power supply circuit 34, the AC/DC adapter 51, the battery unit 52, and the power button 53 that constitute a power supply system are not illustrated.

The main system 110 is the main part of the computer system of the information processing apparatus 1. The processor 11 is configured to execute a predetermined program (e.g., a utility) that implements the functions of the main system 110.

The main system 110 includes, among other components a mode control unit 112 and a resource management unit 114. The mode control unit 112 is configured to control the operating mode based on the operating state of the main system. The resource management unit 114 is configured to control the execution of various programs by the processor 11 and manage resources used for the execution thereof.

The control unit 120 is configured to control the operation of the information processing apparatus 1 based on the operating environment or use situation of the information processing apparatus 1. The EC 31 is configured to execute a predetermined program to implement the functions of the control unit 120.

In various embodiments, the control unit 120 includes, among other components, an event detection unit 122, a power monitoring unit 124, and a mode control unit 126. The event detection unit 122 is configured to detect an event as an opportunity to make a transition of the operating state of the processor 11 from one state to another state (e.g., a different state) according to the operating environment or use situation of the information processing apparatus 1.

In some embodiments, detection of one or more events cause the operating state to transition from the idle state to the active state (hereinafter, an active event). In additional or alternative embodiments, detection of one or more events cause the operating state to transition from the active state to the idle state (hereinafter, an idle event). The active event and the idle event can be defined as events that satisfy the transitional conditions of one or more operating states between the idle state and the active state, respectively. Examples of the active event and the idle event are described elsewhere herein.

The power monitoring unit 124 is configured to monitor, as power is consumed, the amount of power supplied to each unit (in particular, the main system 110) of the information processing apparatus 1 from the power supply circuit 34. The mode control unit 126 is configured to control the operation of the main system 110 based on ether the event detected by the event detection unit 122 and/or the amount of power consumption detected by the power monitoring unit 124.

In addition to the system memory 12, the ROM 22, and the storage 23, various embodiments of the storage unit 155 include, among other components, a storage medium attached to the card reader 25, a storage media of the SoC 21, and the EC 31. The detection unit 160, the communication unit 165, the operation input unit 170, the sound collection unit 175, and the display output unit 180 correspond to the sensor 33, the communication module 26, the input unit 32, the audio system 27, and the display 14, respectively, as discussed elsewhere herein.

Next, various embodiments of the processing executed by the main system 110 are discussed. The mode control unit 112 enables transitions among a G0 state, the S0ix state, a G1 state, and a G3 state as operating modes of the information processing apparatus 1.

Among the operating modes of the information processing apparatus 1, the G0 state, the G1 state, and the G3 state correspond to three (3) states of a predetermined four (4) global system states. The G0 state corresponds to the S0 state as a power state (e.g., an active state). The S0ix state and the G1 state correspond to idle states. The G1 state corresponds to the S4 state as a power state. The G3 state is a stopped state in which the supply of power to the information processing apparatus 1 is stopped (except to the power supply system) so that standby power is not generated or so that standby power is extremely low. The G3 state is also called a Mechanical Off state. Therefore, the power consumption of the system in the G1 state is lower than the power consumption in the G0 state. Further, the G3 state (which is generally low in the power consumption of the system) takes a longer amount of time to resume/transition to operating in the G0 state than the G1 state.

The S0ix state, which is an idle state lower in power consumption than the S0 state, includes an operating mode extended from the S0 state. Note that, since power supply to the system memory 12 is maintained in the S0ix state, the S0ix state is changed to the normal operating mode more quickly than the S3 state, but the S0ix state is higher in power consumption than the S3 state. Further, in response to the mode control unit 112 detecting a predetermined active event in the S0ix state, the operating state is switched to the active state (e.g., the S0 state).

For example, the mode control unit 112 is notified of the detection of an active event by receiving a notification from the control unit 120 or the resource management unit 114. Example active events indicated by the notification from the control unit 120 include, but are not limited to, a state in which the first chassis 61 and the second chassis 62 of the information processing apparatus 1 are open, input of an operation signal from the operation input unit 170, and/or the like events.

In some embodiments, active events indicated by a notification from the resource management unit 114 include predetermined events detected by executing predetermined limited functions (hereinafter, limited functions) provided in the S0ix state. For example, the predetermined events include events that can infer a user's intention to use the information processing apparatus 1, such as receipt of a new email via a constant connection, recognition of a voice command by an utterance detection, and/or user authentication that is acquired via user authentication information, such as a fingerprint.

More specifically, upon receipt of an email, the resource management unit 114 uses the communication unit 165 to transmit, to a predetermined mail server, a receipt request for the email addressed to the information processing apparatus 1 in response to executing a predetermined mail app to receive the email. As a response to the email reception request from the email server, the resource management unit 114 is configured to receive the new email addressed to the information processing apparatus 1 and accumulate/store the new email in the storage 23. Subsequently, the mode control unit 112 may change the operating state of the information processing apparatus 1 from the active state to the idle state.

Upon recognition of a voice command, the resource management unit 114 is configured to execute a predetermined speech recognition app and wait for audio data input from the audio system 27. The resource management unit 114 is configured to perform speech recognition processing on the input audio data and determine whether utterance information obtained in the input audio data is a predetermined voice command. In response to the resource management unit 114 determining that the utterance information is a predetermined voice command, the mode control unit 112 is configured to change the operating state of the processor 11 from the S0ix state to the S0 state. The resource management unit 114 is further configured to execute processing instructed by the determined voice command.

Upon user authentication, for example, a predetermined utility is executed to check authentication information input from the detection unit 160 against pre-registered user authentication information. In response to determining that both match each other, the mode control unit 112 is configured to change the operating state of the system from the S0ix state to the S0 state. Examples of authentication information include, but are not limited to, a fingerprint, an iris, and/or one or more vein patterns, among other biometrics that are possible and contemplated herein. Some embodiments include a device capable of acquiring the authentication information as the detection unit 160 (e.g., a fingerprint sensor or a camera used to take a picture of the iris or vein pattern).

In additional or alternative embodiments, in response to the operating state being the S0 state and an idle event is detected, the mode control unit 112 is configured to change the operating state of the processor 11 from the S0 state (e.g., the active state) to the S0ix state (e.g., the idle state). In some embodiments, the mode control unit 112 is notified of the idle event by receiving a notification indicative of the detection of an idle event from the control unit 120 or the resource management unit 114.

In various embodiments, idle events indicated by a notification from the control unit 120 can include, but are not limited to, a state in which the two chassis of the information processing apparatus 1 are closed, the press-down of a predetermined character input key (e.g., a hot key), and/or selection of a sleep menu displayed on an OS setting screen, among other idle events that are possible and contemplated herein. Further, a notification indicative of the utilization of the processor 11 may be input every predetermined time from the resource management unit 114 to the mode control unit 112. Here, such a state that the use rate of the processor 11 is equal to or less than a predetermined use rate (e.g., in the range of about 1 to about 5%) and the time during which no operational signal is input from the operation input unit 170 is continuously equal to or more than a predetermined time (e.g., in the range of about 3 minutes to about 15 minutes) may be detected and/or determined to be an idle event.

In one embodiment, at the start of changing the operating state of the processor 11, the mode control unit 112 may also output, to the control unit 120, a change-of-operating-state notification indicative of the start of changing the operating state. In response to a mode transition instruction indicative of the transition to the active state (e.g., a boot process) is input from the control unit 120, the mode control unit 112 is configured to change the operating state of the processor 11 from the S0ix state to the S0 state. In some embodiments, the mode control unit 112 is configured to transmit a notification indicative of the occurrence of an active event on the information processing apparatus 1 to the control unit 120 that cancels out a transition condition that would otherwise cause the control unit 120 to change the operating state of the processor 11 from the S0 state to the S0ix state. Further, in response to a mode transition instruction indicative of the transition to the idle state (e.g., a sleep state) is input from the control unit 120, the mode control unit 112 is configured to change the operating state of the processor 11 from the S0 state to the S0ix state.

Note that, when mode setting information indicative of the estimated period of use of the information processing apparatus 1 is preset in the mode control unit 112, the mode control unit 112 may make a transition from the S0ix state as the idle state to the S4 state as a deeper idle state. More specifically, when the present point of time moves from within the estimated period of use to the outside of the estimated period of use, the mode control unit 112 controls the operating state of the processor 11 from the S0ix state to the S4 state. Alternatively, when the point of time moves from the outside of the estimated period of use to within the estimated period of use, the mode control unit 112 controls the operating state of the processor 11 from the S4 state to the S0ix state. The estimated period of use is the period of time in which the information processing apparatus 1 is usually used and set for each day of the week or with each distinction between weekdays and holidays. The estimated period of use may be able to be set with a user's operation according to a predetermined set menu or set based on the first boot time and the last shut-down time of everyday recorded in an operation log.

Next, various embodiments of the processing executed by the control unit 120 are discussed. Based on an operation signal input from the operation input unit 170 or a detection signal input from the communication unit 165, the event detection unit 122 is configured to detect, as an active event or an idle event, the operating environment or the use situation as an opportunity to control the operating mode of the information processing apparatus 1 or a change in the operating environment or the use situation. For example, the event detection unit 122 detects the following events as active events: a state in which the first chassis 61 is open with respect to the second chassis 62 (e.g., a state in which the open angle θ is greater than or equal to a predetermined open angle (e.g., an angle is the range of about 45° to about 90°)), input of an operation signal from the operation input unit 170, and/or the like. Here, the event detection unit 122 can determine the open/closed state of the first chassis 61 with respect to the second chassis 62 based on the detection signal input from the detection unit 160.

In additional or alternative embodiments, the event detection unit 122 is configured to detect the following events as idle events: a state in which the first chassis 61 is closed with respect to the second chassis 62 (e.g., a state in which the open angle θ is less than the predetermined open angle (e.g., in the range of about 45° to about 90°)), the selection of a predetermined character input key (e.g., an instruction of a character input key by an operation signal input from the operation input unit 170 based on the OS setting screen), the selection of a sleep menu (e.g., an instruction of a sleep menu by an operation signal input from the operation input unit 170 among a plurality of various menus arranged on the OS setting screen), and/or the like. When viewed from a different angle, the active event can be regarded as the operating state or a use situation that satisfies the transition condition from the idle state to the active state and the idle event can be regarded as the operating state or the use situation that satisfies the transition condition from the active state to the idle state. The event detection unit 122 may further output, to the mode control unit 126, a notification indicative of the detected event.

The power monitoring unit 124 is configured to monitor power consumption (particularly, the power consumption of the main system 110) indicated by power consumption information input from the power supply circuit 34 at one or more predetermined time intervals (e.g., about every 1 to 15 seconds). The power monitoring unit 124 may then output the input power consumption information to the mode control unit 126.

The mode control unit 126 is configured to control the operating state of the main system 110 based on the notification information input from the event detection unit 122 and/or the power consumption information input from the power monitoring unit 124. After starting the transition of the main system 110 from the active state to the idle state and in response to the power consumption indicated by the input power consumption information exceeding a predetermined reboot determination threshold value, the mode control unit 126 is configured to cause the operating state of the main system 110 to be restored to the active state from one of the idle states.

For example, in response to the change-of-operating-state starting notification indicating the start of a change from the active state to the idle state is input from the mode control unit 112 of the main system 110, the mode control unit 126 is configured to detect the start of the transition of the main system 110 from the active state to the idle state. Further, in response to the notification indicating an idle event being input after a notification indicative of the last active event being input from the event detection unit 122, the mode control unit 126 may estimate the transition from the active state to the idle state. Here, output of the change-of-operating-state starting notification from the mode control unit 112 and waiting for the change-of-operating-state starting notification in the mode control unit 126 may be omitted.

When restoring the operating state of the main system 110 to the active state, the mode control unit 126 is configured to output, to the mode control unit 112, a mode transition instruction indicative of the transition from an idle state to the active state. Subsequently, the mode control unit 126 causes the operating state of the main system 110 to make the transition to the idle state again. In causing the operating state of the main system 110 to make the transition to the idle state, the mode control unit 126 is configured to output, to the mode control unit 112, a mode transition instruction indicative of the transition to the idle state.

Note that, when notification information indicative of a predetermined idle event is input before the operating state of the main system 110 is restored to the active state, the transition from the active state to the idle state may be estimated. Here, the mode control unit 126 may output, to the mode control unit 112 of the main system 110, a notification indicative of a use situation for canceling the transition condition to the idle state when the operating state of the main system 110 is restored to the active state. Such a use situation may be a virtual use situation that is different from reality or a real use situation. For example, when the state where two chassis are closed is set as the idle event, the use situation can be a use situation opposite to the last idle event like an active event in which two chassis are open. When a notification indicative of this active event is input from the mode control unit 126 to the control unit 120, the mode control unit 112 of the main system 110 can change the operating state to the active state. Therefore, when this notification is output, the mode control unit 126 of the control unit 120 does not have to output, to the mode control unit 112, a mode transition instruction indicative of the transition from an idle state to the active state.

For example, in a situation in which input of an operation signal from the operation input unit 170 is not continuously detected for a predetermined amount of time or more is set as the idle event, the use situation for canceling the transition condition to the idle state may be an input of the operation signal from the operation input unit 170. The input of this operation signal is also an example of an active event. Even when a notification is indicative of this active event is input from the mode control unit 126 to the control unit 120, the mode control unit 112 of the main system 110 can also change the operating state to the active state. Thus, even if the use situation for canceling the transition condition to the idle state actually occurs, the use situation for canceling the transition condition to the idle state can be notified to the main system 110 to block the transition of the operating state of the main system 110 to the idle state in order to reliably change the operating state to the active state.

Figure 4:
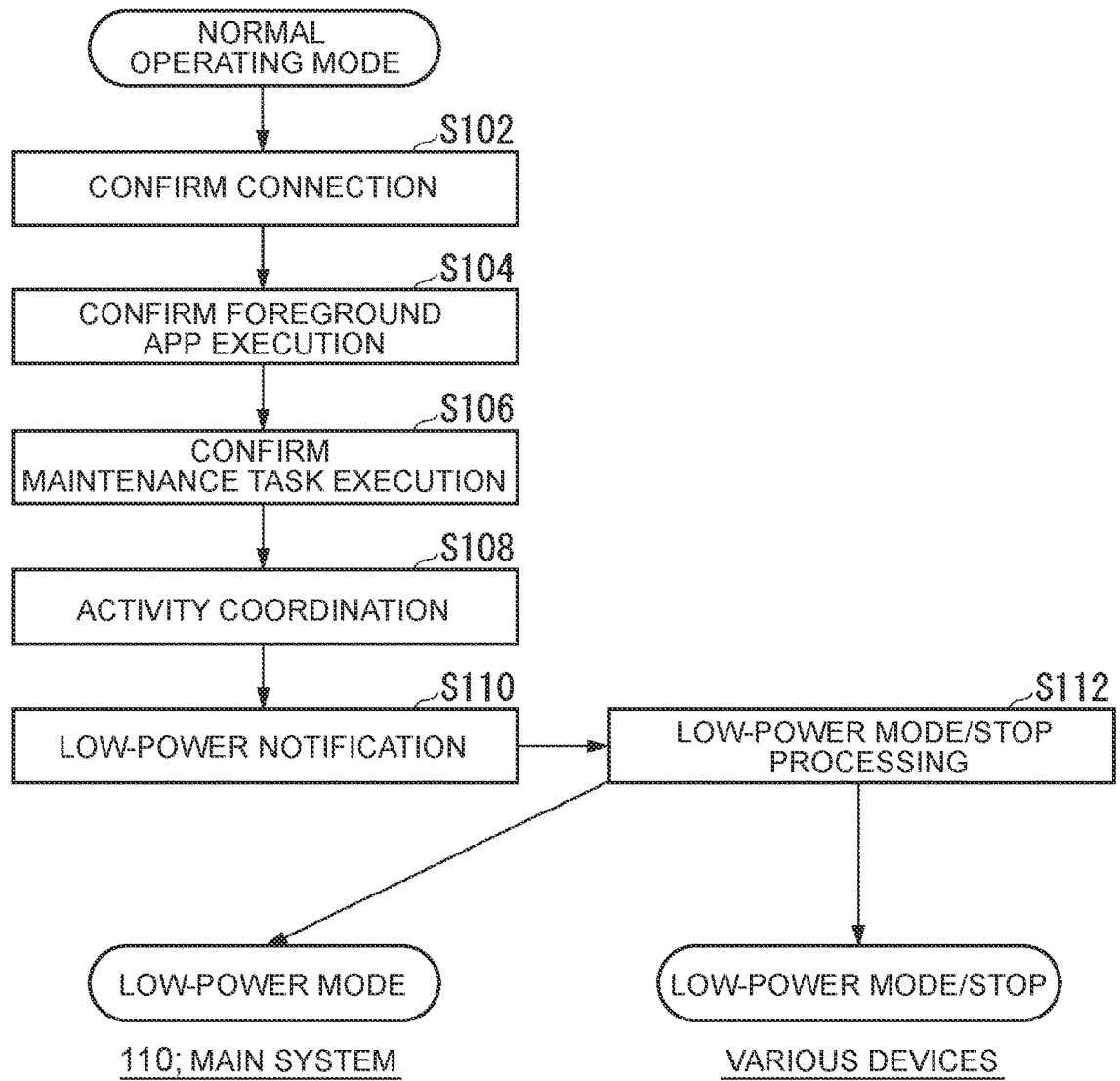
FIG. 4 is a flowchart illustrating one embodiment of a mode transition preparation process.

Next, embodiments of processing related to the preparation of the mode transitioning from the active state to the idle state (hereinafter, a mode transition preparation process) are discussed. FIG. 4 is a flowchart illustrating one embodiment of a mode transition preparation process. The mode control unit 112 starts the processing illustrated in FIG. 4 in response to the operating state of the information processing apparatus 1 being the active state (e.g., a normal operating mode) and an active event is detected. The active state is also called a No-CS (Connected Standby) phase.

The mode control unit 112 confirms the presence or absence of any other device connected to the information processing apparatus 1 via the communication unit 165 (connection confirmation) (Block S102). The processing in Block S102 is also called a connection phase.

The processing illustrated in FIG. 4 stops in response to no other device being connected to the information processing apparatus 1. In response to one or more other devices being connected to the information processing apparatus 1, the mode control unit 112 confirms the presence or absence of any app being executed in the foreground of the OS other than a predetermined limited app(s) (e.g., confirmation of foreground app execution) (Block S104). The processing in Block S104 is also called a Process Lifetime Manager (PLM) phase.

In response to an app not being executed, the processing illustrated in FIG. 4 ends. In response to any app being executed, the mode control unit 112 proceeds to processing in Block S106.

The mode control unit 112 confirms the presence or absence of a maintenance task being executed (e.g., confirmation of maintenance task execution) (Block S106). The processing in Block S106 is also called a maintenance phase. In response to a maintenance task being executed, the mode control unit 112 waits until the end of the maintenance task being executed and proceeds to processing in Block S108 after the end of the maintenance task.

The mode control unit 112 reduces power consumption forcibly to a predetermined amount of consumption or less after the drop of a power request by an app or after a predetermined time (e.g., 3 to 15 minutes) has elapsed (e.g., activity coordination) (Block S108). The processing in Block S108 is also called a Desktop Activity Moderator (DAM) phase. Subsequently, the mode control unit 112 proceeds to processing in Block S110.

The mode control unit 112 uses the video subsystem 13 and the SoC 21 to output notification information, which is indicative of a transition from the active state to the idle state, to each of devices connected directly and indirectly (low-power notification) (Block S110). The processing in Block S110 is also called a low-power phase.

Each device receives, from the mode control unit 112, a notification indicative of the transition to the idle state. The phase in which this notification is received is also called a resiliency notification phase. After that, each device changes the operating state to an operating mode lower in power consumption than a standard operating state or stops the operation thereof (e.g., low-power mode/stop processing). The operation of some devices that are not expected to operate in the idle state may be stopped. Such devices may include, for example, the video subsystem 13, the display 14, the storage 23, the input/output IF 24, and the card reader 25, among other devices that are possible and contemplated herein.

In the S0ix state, the power consumption of each of devices used to provide each of predetermined limited functions can be reduced up to the amount of power consumption required to maintain the function or for restoration to the active state. Such devices may include, for example, the EC 31, the input unit 32, the sensor 33, the communication module 26, and the audio system 27, among other devices that are possible and contemplated herein. Alternatively, the operating state of the main system 110 makes a transition to a low-power mode (e.g., idle state) and the processing illustrated in FIG. 4 can end. At this stage, the mode control unit 112 can make a transition to an operating state further lower in power consumption (e.g., to the S4 state). This state is also called a resiliency phase.

The mode transition preparation processing illustrated in FIG. 4 includes a plurality of phases that can be executed sequentially. Therefore, when processing in a certain phase is not completed, the procedure does not proceed to processing in subsequent phases and hence the transition to the idle state is not completed. This situation can cause the power consumption of the entire system of the information processing apparatus 1 not to be sufficiently reduced. For example, when the operation of a certain device is not stopped in Block S112, the operating state cannot make the transition to the idle state since the main system 110 performs device management and resource management corresponding to the operation of the device.

Figure 5:
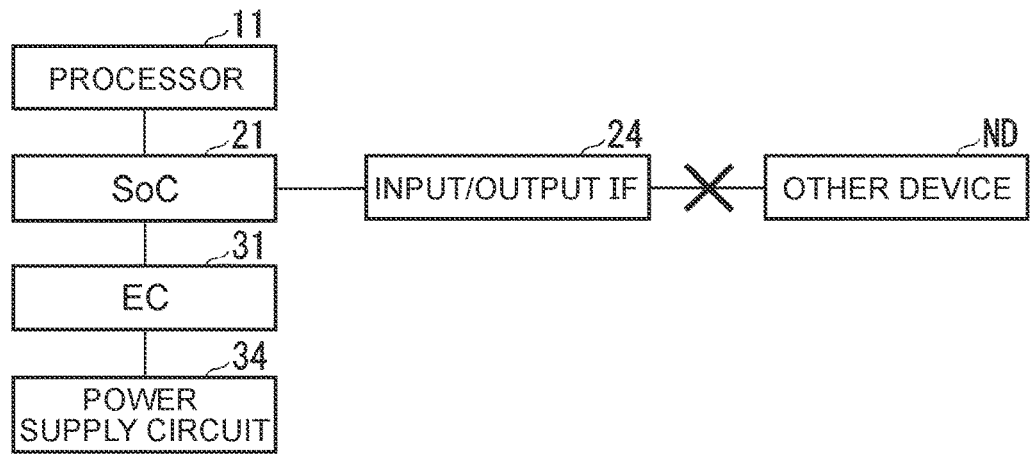
FIG. 5 is a diagram illustrating one embodiment of a cause of stopping the mode transition preparation processing illustrated in FIG. 4.

As illustrated in FIG. 5, an event may occur when any other device ND connected to the input/output IF 24 is removed from the input/output IF 24 just before the operating state makes the transition from the active state to the idle state. This occurs because of a latency period between the time when the other device ND is removed from the input/output IF 24 and the mode control unit 112 is notified of the removal of the other device ND.

The SoC 21 monitors devices directly or indirectly connected to the information processing apparatus 1 every predetermined amount of time to detect a newly connected device or a newly disconnected device. The SoC 21 outputs, to the processor 11, an event notification indicative of the connected or disconnected device. Thus, there is a latency period from the removal of the other device ND until the mode control unit 112 is notified of the removal of the other device ND.

Figure 6:
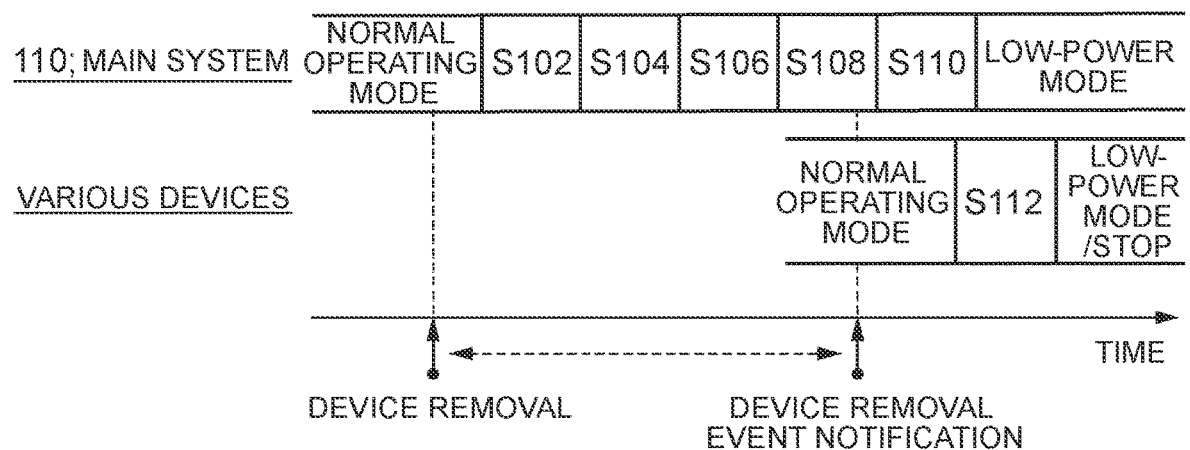
FIG. 6 is a flowchart illustrating one embodiment of executing the mode transition preparation process illustrated in FIG. 4.
Figure 7:
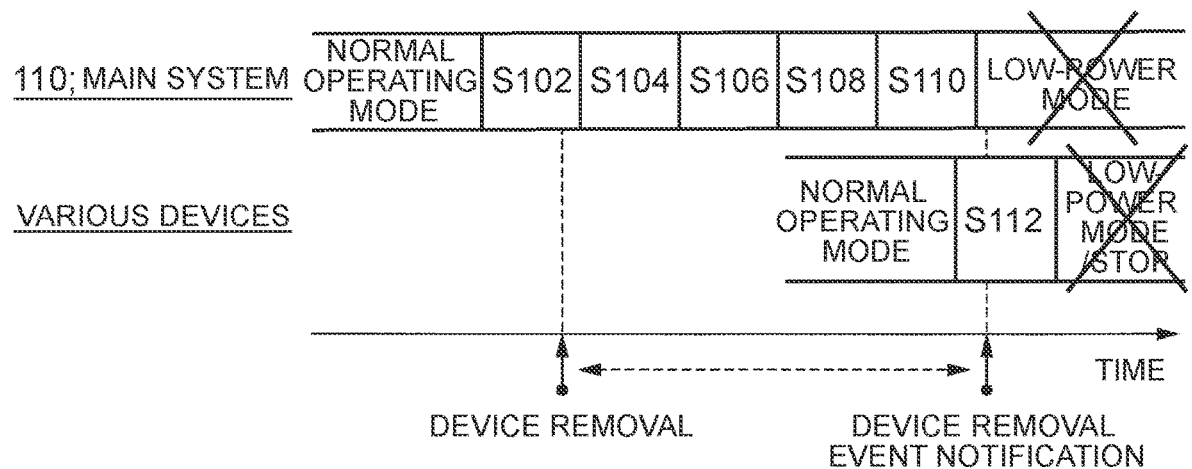
FIG. 7 is a flowchart illustrating another embodiment of executing the mode transition preparation process illustrated in FIG. 4.

As illustrated in FIG. 6, In response to the notification time for notifying the mode control unit 112 of the removal of the other device ND is, at the latest, earlier than the start time of the processing in Block S110, the processing in Block S110 is executed in such a state that the absence of the other device ND is recognized. Therefore, the processing in Block S110 and hence the processing in FIG. 4 are ended normally. Alternatively, as illustrated in FIG. 7, In response to the notification time of notifying the mode control unit 112 of the removal of the other device ND is later than the start time of the processing in Block S110, the processing in Block S110 is attempted based on the assumption that the other device ND is connected. However, in reality, since the other device ND is not connected at that point, the processing in Block S110 is not completed. Such an event can occur even if the removal of the other device ND is before the start time of processing related to the transition of the operating state. Therefore, power consumption may not be reduced sufficiently.

In addition to the removal of hardware just before the transition of the operating state, the completion of the execution of an app, no response (of Suspend), and the like can cause the processing in Block S110 not to be ended, and hence the transition of the operating state may not to be completed. In contrast, in some embodiments, when power consumption exceeds the reboot determination threshold value even after the start of the transition of the operating state, the mode control unit 126 causes the operating state of the main system 110 to be once again restored to the active state. Subsequently, the mode control unit 126 attempts the processing for causing the operating state of the main system 110 to make the transition to the idle state. The transition of the operating state will be completed unless the processing related to the transition of the operating state is stopped. Therefore, power consumption can be reduced more reliably.

Figure 8:
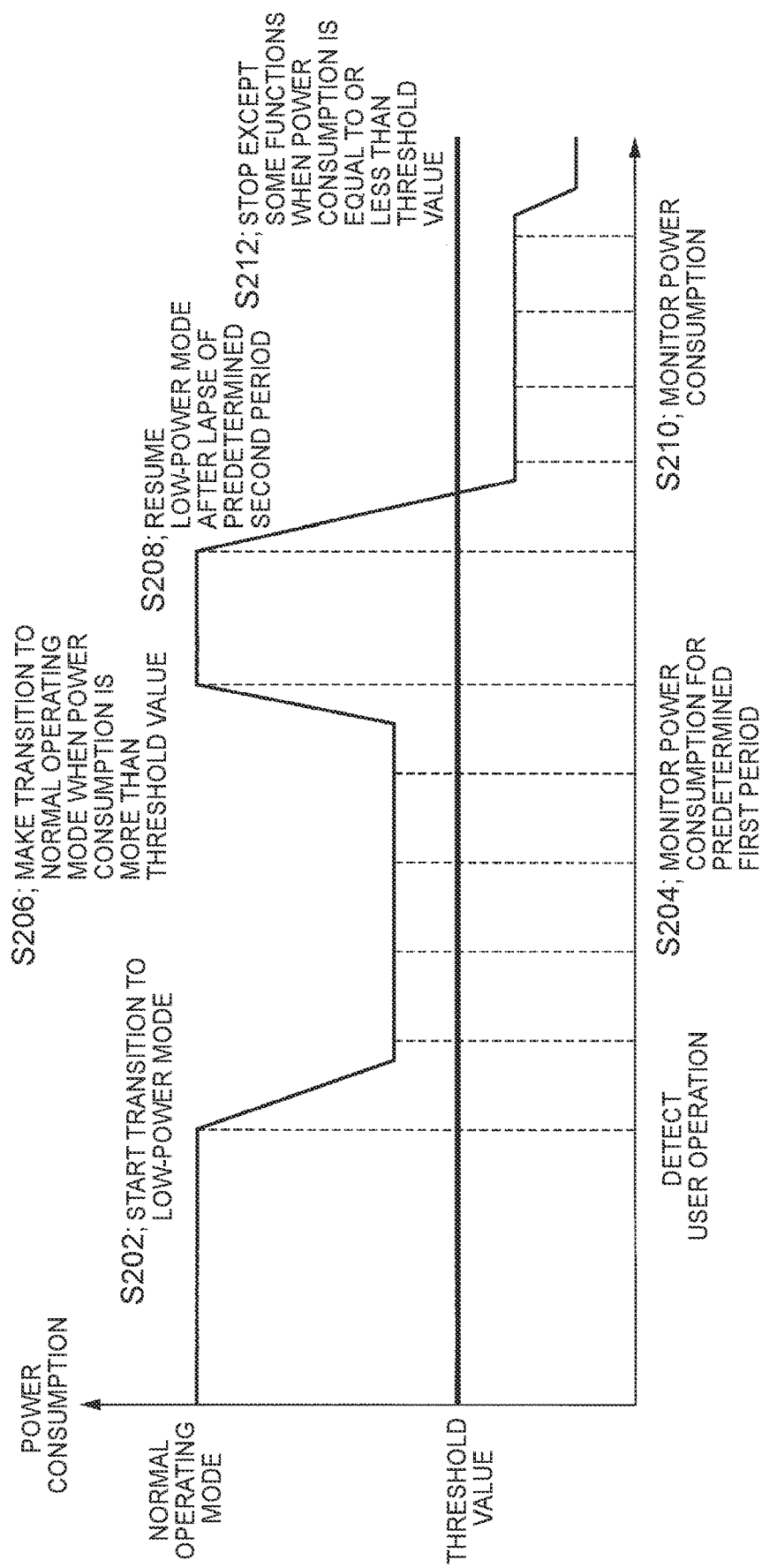
FIG. 8 is a chart illustrating one embodiment of the power consumption of a main system for the information processing apparatus illustrated in FIG. 1.

Next, various embodiments of mode transition processing are discussed. FIG. 8 is a chart illustrating an example of the power consumption of the main system 110 according to one embodiment. The vertical line and the horizontal line represent power consumption and time, respectively. FIG. 8 also illustrates changes over time in power consumption point by point in a series of processing that starts when the initial operating state of the main system 110 is the active state (e.g., a normal operating mode).

Block S202. The event detection unit 122 of the control unit 120 monitors input of a detection signal from the detection unit 160 and input of an operation signal from the operation input unit 170. The event detection unit 122 determines whether a predetermined user operation is an idle event (e.g., the first chassis 61 is closed with respect to the second chassis 62). The event detection unit 122 outputs, to the main system 110, a notification indicative of the detected idle event. The mode control unit 112 of the main system 110 starts the execution of a mode transition preparation process for transitioning the operating state of the main system 110 from the active state to the idle state (e.g., starts the transition to the low-power mode). The power consumption of the main system 110 is reduced according to the progress of the mode transition preparation. After that, the procedure proceeds to processing in Block S204.

Block S204. The power monitoring unit 124 of the control unit 120 monitors the power consumption of the main system 110 for a predetermined first period of time T1 after the idle event is detected. The first period of time T1 may be greater than or equal to the time required for the mode transition preparation process. The event detection unit 122 determines whether power consumption at the end of the first period of time T1 is greater than a predetermined reboot determination threshold value. The reboot determination threshold value should be greater than the power consumption when the operating state of the main system 110 is the idle state and less than the power consumption when the operating state is the active state. When the power consumption at this point is greater than the reboot determination threshold value, the procedure proceeds to processing in Block S206, while when the power consumption is less than or equal to the reboot determination threshold value, the procedure proceeds to processing in Block S212.

Block S206. The mode control unit 126 of the control unit 120 causes the operating state of the main system 110 to make a transition to the active state (e.g., a normal operating mode). Here, the mode control unit 126 outputs, to the main system 110, a mode transition instruction indicative of the transition to the active state. The mode control unit 112 of the main system 110 causes the operating state of the main system 110 to make a transition from the idle state to the active state (e.g., a normal operating mode). The power consumption of the main system 110 increases to a state before the transition to the idle state.

When there is an active event opposite to the detected idle event in Block S202, the mode control unit 126 outputs, to the mode control unit 112, a notification indicative of the active event (e.g., the first chassis 61 is opened with respect to the second chassis 62). After that, the mode control unit 126 proceeds to processing in Block S208.

Block S208. After further waiting for a predetermined second period of time T2, the mode control unit 126 causes the operating state of the main system 110 to make a transition to the idle state (e.g., a low-power mode). The event detection unit 122 outputs, to the main system 110, a notification indicative of the detected idle event. The mode control unit 112 of the main system 110 resumes the execution of mode transition preparation for the transition of the operating state of the main system 110 from the active state to the idle state. The power consumption of the main system 110 is reduced according to the progress of the mode transition preparation. After that, the procedure proceeds to processing in Block S210. The second period of time T2 may be greater than or equal to the amount of time required to perform processing related to the transition of the operating state of the main system 110 from the idle state to the active state. After that, the procedure proceeds to processing in Block S210.

Block S210. The power monitoring unit 124 of the control unit 120 again monitors the power consumption of the main system 110 for the predetermined first period of time T1 after the idle event is detected. The event detection unit 122 determines whether power consumption at the end of the first period of time T1 is greater than the reboot determination threshold value. In response to the power consumption at this point being greater than the reboot determination threshold value, the procedure may return to the processing in Block S206 to repeat the processing from Block S206 to Block S210. In response to the power consumption being less than or equal to the reboot determination threshold value, the procedure proceeds to processing in Block S212.

Block S212. When a state in which the power consumption of the main system 110 is less than or equal to the reboot determination threshold value further continues for a third period of time T3 (e.g., about 3 to 15 minutes) or more, the power monitoring unit 124 of the control unit 120 may change the operating state of the control unit 120 to a low-power consumption state that is lower in power consumption than the standard operating state. In the low-power consumption state, one or more predetermined functions (e.g., the timer, the detection of press-down of the power button 53, and the like) may be maintained and one or more other functions may be stopped.

Note that an upper limit of the number of repetitions of the processing from Block S206 to Block S210 may be preset in the power monitoring unit 124 of the control unit 120. In this case, when the number of repetitions of the processing from Block S206 to Block S210 is counted and the counted number of repetitions reaches an upper limit, the power monitoring unit 124 may stop the mode transition processing without further repeating the processing from Block S206 to Block S210.

Further note that control of the operating state of the main system 110 by the control unit 120 is mainly described above, but the present technology is not limited thereto. That is, the control unit 120 may also include a device control unit 128 (not illustrated) that identifies, based on a time series of power consumption, a device in which an abnormal operation occurs. In this case, power consumption pattern data indicative of the time series of power consumption (hereinafter, a power consumption pattern) at the time of abnormality is stored for each device in the storage unit 155.

Figure 9:
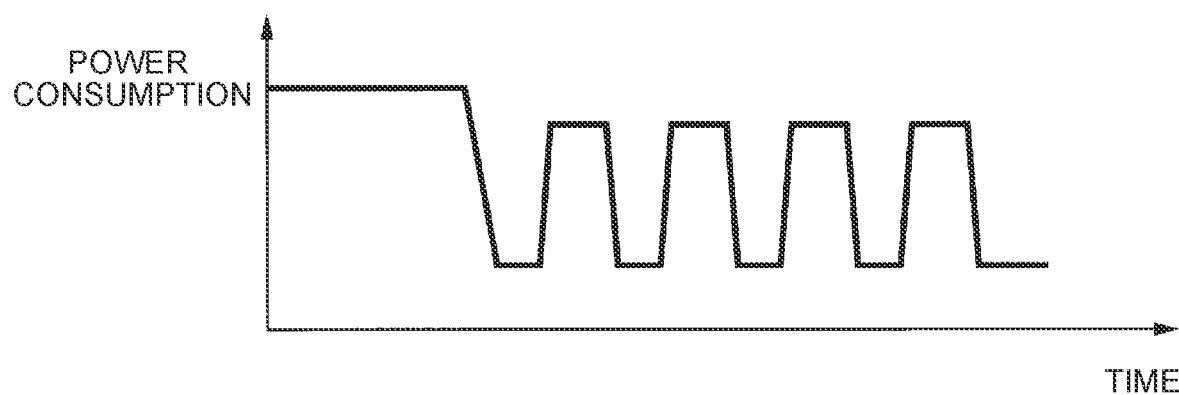
FIG. 9 is a chart illustrating a first example of a power consumption pattern at a time of abnormality.
Figure 10:
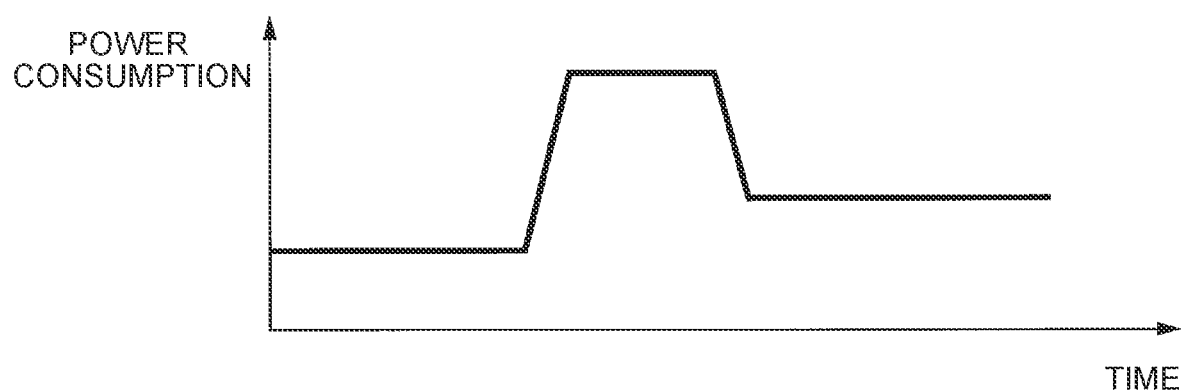
FIG. 10 is a chart illustrating a second example of the power consumption pattern at a time of abnormality.
Figure 11:
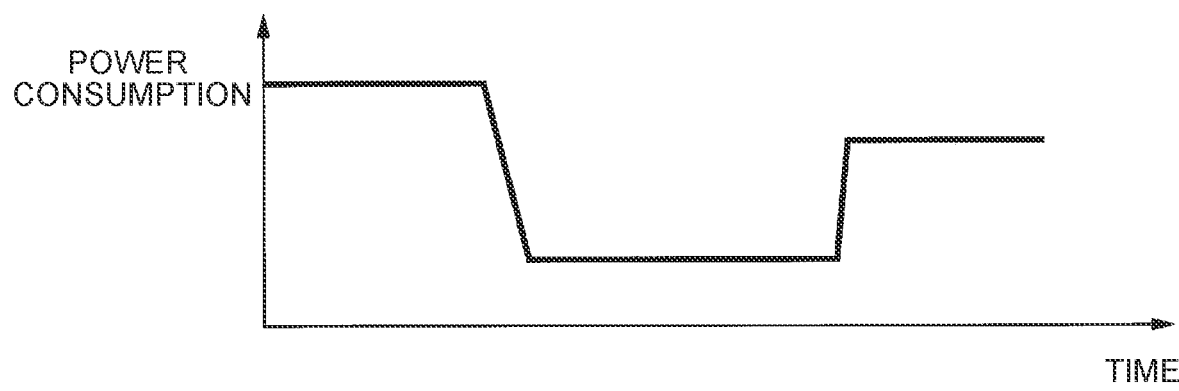
FIG. 11 is a chart illustrating a third example of the power consumption pattern at a time of abnormality.

The preset time series of power consumption indicated by the power consumption pattern data is called a power consumption pattern. FIGS. 9, 10, and 11 illustrate power consumption patterns illustrating abnormalities of the communication module 26, the input/output IF 24, and the SoC 21, respectively.

The power consumption pattern illustrated in FIG. 9 keeps on increasing and decreasing. Such a phenomenon tends to occur, for example, when the connection with any other device is unstable.

The power consumption pattern illustrated in FIG. 10 indicates a phenomenon that the power consumption increases sharply after a low-power consumption state and then decreases but keeps on being greater than the original power consumption. Such a phenomenon tends to occur, for example, when the connection with any other device is interrupted.

The power consumption pattern illustrated in FIG. 11 indicates a phenomenon that the power consumption decreases sharply after a high-power consumption state is measured and then increases but keeps on being less than the original power consumption. Such a phenomenon can occur, for example, when input/output of data between the main system 110 and the SoC 21 becomes out of sync.

The device control unit 128 forms a time series of power consumption (hereinafter, an observed power consumption pattern) observed by aggregating power consumption at each time indicated by the power consumption information input from the power monitoring unit 124 for a predetermined observation period up to the latest time. The device control unit 128 is configured to calculate an index indicative of a degree of similarity with the formed observed power consumption pattern for each power consumption pattern indicated by the power consumption pattern data to identify a power consumption pattern for which the calculated index is greater than or equal to a predetermined lower limit value and which is the highest in the degree of similarity. As the index indicative of the degree of similarity, for example, a correlation coefficient or a Euclidean distance can be used. The device control unit 128 can identify a device related to the identified power consumption pattern.

Guidance information (e.g., a guide) indicative of the occurrence of abnormality may be prestored for each device in the storage unit 155 so that the device control unit 128 outputs, to the display output unit 180, guidance information corresponding to the identified device. The guidance information may also include corresponding information useful for the elimination or alleviation of an abnormality. The display output unit 180 can present the guidance information corresponding to the device. The user that receives the guidance information can notice the abnormality that occurred in the device. By receiving corresponding information, the user can take measures for the elimination or alleviation of the abnormality.

The device control unit 128 may perform a predetermined control process on the identified device to eliminate the abnormality that occurred. For example, when identifying the abnormality of the communication module 26, the device control unit 128 outputs, to the communication module 26, a control signal (hereinafter, a restart signal) indicative of a restart (or reset). When the restart signal is input from the device control unit 128, the communication module 26 stops the operation of the information processing apparatus 1 and restarts after completing the stop. Thus, the communication module 26 can be restarted.

When identifying the abnormality of the input/output IF 24, the device control unit 128 outputs, to the power supply circuit 34, a control signal (hereinafter, a power stop signal) indicative of the stop of the supply of power to the input/output IF 24. When the power stop signal is input from the device control unit 128, the power supply circuit 34 stops the supply of power to the input/output IF 24, and restarts the supply of power after a predetermined time (e.g., about 1 to 3 seconds). Thus, the input/output IF 24 can be restarted.

In identifying the abnormality of the SoC 21, the device control unit 128 outputs, to the resource management unit 114 of the main system 110, a control signal (hereinafter, a reboot control signal) indicative of rebooting the SoC 21. When the reboot control signal is input from the device control unit 128, the resource management unit 114 recognizes the SoC 21 again as the device connected to the own unit and performs sync processing with the SoC 21. In this processing, the SoC 21 is rebooted. Upon restart or reboot, predetermined initial values are set for these devices to restart or reboot the operation of these devices using the set initial values so that the abnormality that occurred can be eliminated.

As described herein, the information processing apparatus 1 according to various embodiments includes the computer system (e.g., the main system 110) capable of making a transition between the active state and the idle state, in which the idle state is an operating state lower in power consumption than the active state. Further, the information processing apparatus 1 includes the controller (e.g., the control unit 120) which, when the power consumption of the computer system exceeds a predetermined power consumption threshold value (e.g., the reboot determination threshold value) after starting the transition from the active state to the idle state, causes the operating state of the computer system to be restored to the active state, and after that, causes the operating state of the computer system to make the transition to the idle state.

According to various configurations, when the power consumption is not reduced sufficiently after starting the transition of the operating state of the computer system to the idle state, the operating state is temporarily restored to the active state and then transitions to the idle state. When the cause of inhibiting the transition to the idle state is already eliminated upon restoration of the operating state to the active state, the transition to the idle state is completed. Therefore, the power consumption can be reduced more reliably.

Further, when the use situation of the information processing apparatus 1 detected by the controller meets a predetermined transition condition (e.g., when an idle event is detected), the computer system may start the transition from the active state to the idle state. When the operating state of the computer system is restored to the active state, the controller may notify the computer system of a use situation (e.g., an active event) that removes the transition condition. According to various configurations, even when the use situation meets the predetermined transition condition in reality, since the computer system can be caused to recognize a use situation that removes the transition condition to block the transition to the idle state due to the recognition of the transition condition, the operating state restored to the active state can be stabilized.

The information processing apparatus 1 may further include the first chassis, the second chassis, and the sensor (e.g., the sensor 33) that detects the positional relationship between the first chassis and the second chassis. When the transition condition to the idle state is the state that includes the first chassis being closed with respect to the second chassis, the controller notifies the computer system of the state that includes the first chassis being open with respect to the second chassis as the use situation that removes the transition condition when the operating state of the computer system is restored to the active state. According to this configuration, when the first chassis is closed with respect to the second chassis, the computer system operates in the idle state and, when the operating state is temporarily restored to the active state, the computer system is notified of the state including the first chassis being open with respect to the second chassis. Thus, the operating state of the computer system being restored to the active state can be stabilized.

Further, the information processing apparatus 1 may include the power supply circuit 34 that supplies power to the information processing apparatus 1. The controller may monitor, as power consumption, the amount of power supplied from the power supply circuit. According to this configuration, since the controller monitors the power consumption independently of the computer system, independence in control of the operating state of the computer system can be increased.

Further, the controller may resume the transition from the active state to the idle state after the lapse of a predetermined amount of time (e.g., the second period of time T2) since the start of restoration to the active state. According to this configuration, the transition to the idle state can be resumed after the transition of the operating state of the computer system to the active state is completed. Therefore, since the cause of inhibiting the transition to the idle state (e.g., a processing delay, no response, or the like) is more likely to be eliminated due to the completion of the transition to the active state, the transition to the idle state is made more reliably and hence the power consumption can be reduced.

Further, one or more other devices cooperating with the computer system (e.g., the ROM 22, the storage 23, the input/output IF 24, the card reader 25, the communication module 26, the audio system 27, and the like) may be connected to the information processing apparatus 1. In the controller, a power consumption pattern indicative of a time series of power consumption at the time of an abnormality may be preset for each device and a device corresponding to the monitored time series of power consumption may be identified based on the power consumption pattern. According to this configuration, the controller can identify a device in which the abnormality occurred without relying on the computer system. Therefore, the controller can take measures to eliminate or alleviate the abnormality in the device in which the abnormality occurred independently of the computer system. Further, the controller may reboot the identified device. According to this configuration, the abnormality that occurred in the device can be eliminated or alleviated by rebooting the device in which the abnormality occurred. Therefore, since the abnormality that inhibits the transition of the operating state to the idle state is eliminated or alleviated, the transition to the idle state can be completed more reliably and hence the power consumption can be reduced more reliably.

While the various embodiments have been described in detail herein with reference to the accompanying drawings, the specific configurations are not limited to that in the embodiments described herein and design changes without departing from the scope of the technology are included. Respective components described in the various embodiments can also be combined. For example, some or all of devices among the storage 23, the input/output IF 24, the card reader 25, the communication module 26, and the audio system 27 may be omitted or made removable. The display 14 and the input unit 32 do not have to be integrated with the information processing apparatus 1 provided they are connected to the other parts of the information processing apparatus 1 in such a manner as to be able to input and output various data.

Further, the first chassis 61 may be made removable from the second chassis 62. The information processing apparatus 1 may include the first chassis 61 and the second chassis 62 without having a structure of making the first chassis 61 openable and closable with respect to the second chassis 62 like a laptop PC, or may include a single chassis to support the other members like a desktop PC. Here, the mode control unit 112 and the event detection unit 122 do not adopt the open/closed state of the first chassis 61 and the second chassis 62 as the active event or the idle event, respectively.

Further, although the above embodiments are described with respect to a situation in which the information processing apparatus is a laptop PC, the various embodiments are not limited thereto. That is, an information processing apparatus 1 (or information handling device) may also include, but is not limited to, a desktop PC, a tablet PC, a personal digital assistance (PDA), or other similar devices/systems. Moreover, an input device is not limited to the pressure-sensitive touchpad 6, but may be, for example, an input device of a game console or an input device provided in an Internet of Things (IoT) device, and the input device can be widely applied to any device that functions as a user interface.

While the present technology has been described in each form, the technical scope of the present technology is not limited to the scope of the above-described aspects and various combinations, changes, or improvements can be added without departing from the scope of the technology. The forms to which the combinations, changes, or improvements are added shall also be included in the technical scope of the present technology.

Embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

The invention claimed is:

1. An apparatus, comprising:
an information handling device that transitions between an active state and an idle state, wherein the idle state includes an operating state lower in power consumption than the active state,
wherein the information handling device is configured to:

monitor an amount of power consumed by the information handling device in the idle state after transitioning from the active state to the idle state,
restore the operating state of the information handling device to the active state in response to detecting that the power consumption exceeds a predetermined power consumption threshold value, and
cause the operating state of the information handling device to transition back to the idle state again after that.

2. The apparatus of claim 1, further comprising:
a display unit coupled to the information handling device, wherein:
the display unit is turned OFF in the idle state,
the information handling device is configured to execute background processing while the display unit is OFF and the information handling device is operating in the idle state, and
the idle state is a low-power consumption state capable of transitioning to the active state relatively quickly.

3. The apparatus of claim 2, further comprising:
a first chassis;
a second chassis; and
a sensor configured to detect a positional relationship between the first chassis and the second chassis,
wherein the information handling device is configured to:
transition from the active state to the idle state in response to determining that the first chassis is closed with respect to the second chassis, and
transition from the idle state to the active state in response to determining that the first chassis is open with respect to the second chassis.

4. The apparatus of claim 3, further comprising:
a power supply circuit that supplies power to the information handling device,
wherein the information handling device is further configured to monitor the amount of power supplied from the power supply circuit to the information handling device as power is consumed by the information handling device.

5. The apparatus of claim 4, wherein the information handling device transitions from the active state to the idle state after a lapse of a predetermined amount of time since transitioning to the active state.

6. The apparatus of claim 5, further comprising:
one or more devices capable of being controlled by the information handling device,
wherein:
the information handling device is configured to preset, for each device, a power consumption pattern indicative of a time series of power consumption at a time of abnormality, and
the information handling device is configured to identify a device corresponding to the monitored time series of power consumption based on the power consumption pattern.

7. The apparatus of claim 6, wherein the information handling device is configured restart the identified device to correct the abnormality.

8. A method for an apparatus including an information handling device configured to transition between an active state and an idle state, wherein the idle state includes an operating state lower in power consumption than the active state, the method comprising:
monitoring an amount of power consumed by the information handling device in the idle state after transitioning from the active state to the idle state;
transitioning an operating state of the information handling device to the active state in response to detecting that the amount of power consumed in the idle state exceeds a predetermined power consumption threshold value; and
causing the operating state of the information handling device to transition back to the idle state subsequent to transitioning to the active state.

9. The method of claim 8, wherein the apparatus further comprises a display unit coupled to the information handling device, the method further comprising:
switching OFF the display unit in response to the information handling device operating in the idle state; and
executing background processing, by the information handling device, while the display unit remains OFF, the information handling device is operating in the idle state, and in response to a predetermined active event,
wherein executing background processing while the display unit remains OFF allows the information handling device to operate in a low-power consumption state that enables the information handling device to transition to the active state relatively quickly.

10. The method of claim 9, wherein the apparatus further comprises a first chassis, a second chassis, and a sensor configured to detect a positional relationship between the first chassis and the second chassis, the method further comprising:
detecting a current positional relationship between the first chassis and the second chassis;
transitioning the information handling device from operating in the active state to operating in the idle state in response to detecting that the first chassis is closed with respect to the second chassis; and
transitioning the information handling device from operating in the idle state to operating in the active state in response to detecting that the first chassis is open with respect to the second chassis.

11. The method of claim 10, wherein the apparatus further comprises a power supply circuit that supplies power to the information handling device, the method further comprising:
monitoring the amount of power supplied from the power supply circuit to the information handling device as power is consumed by the information handling device.

12. The method of claim 11, further comprising:
transitioning, by the information handling device, from the active state to the idle state after a lapse of a predetermined amount of time since transitioning to the active state.

13. The method of claim 12, wherein the apparatus further comprises one or more devices capable of being controlled by the information handling device, the method further comprising:
presetting, for each device, a power consumption pattern indicative of a time series of power consumption at a time of abnormality; and
identifying, by the information handling device, a device corresponding to the monitored time series of power consumption based on the power consumption pattern.

14. The method of claim 13, further comprising:
restarting the identified device, by the information handling device, to correct the abnormality.

15. A computer program product for transitioning an operating state of a processor of an information handling device between an active state and an idle state, wherein the idle state includes an operating state lower in power consumption than the active state, the computer program product comprises a non-transitory computer-readable storage medium including program instructions embodied therewith, the program instructions executable by the processor to cause the processor to:

monitor an amount of power consumed by the processor in the idle state after transitioning from the active state to the idle state;

transition the operating state of the processor to the active state in response to detecting that the amount of power consumed in the idle state exceeds a predetermined power consumption threshold value; and cause the operating state of the processor to transition back to the idle state subsequent to transitioning to the active state.

16. The computer program product of claim 15, wherein the information handling device further comprises a display unit coupled to the processor, the processor further configured to:

switching OFF the display unit in response to the processor operating in the idle state; and executing background processing, by the processor, while the display unit remains OFF, the processor is operating in the idle state, and in response to a predetermined active event, wherein executing background processing while the display unit remains OFF allows the processor to operate in a low-power consumption state that enables the processor to transition to the active state relatively quickly.

17. The computer program product of claim 16, wherein the information handling device further comprises a first chassis, a second chassis, and a sensor configured to detect a positional relationship between the first chassis and the second chassis, the processor further configured to:

detect a current positional relationship between the first chassis and the second chassis;

transition the processor from operating in the active state to operating in the idle state in response to detecting that the first chassis is closed with respect to the second chassis; and transitioning the processor from operating in the idle state to operating in the active state in response to detecting that the first chassis is open with respect to the second chassis.

18. The computer program product of claim 17, wherein the information handling device further comprises a power supply circuit that supplies power to the processor, the processor further configured to:

monitor the amount of power supplied from the power supply circuit to the processor as power is consumed by the processor.

19. The computer program product of claim 18, wherein the processor is further configured to:

transition from the active state to the idle state after a lapse of a predetermined amount of time since transitioning to the active state.

20. The computer program product of claim 19, wherein the information handling device further comprises one or more devices capable of being controlled by the processor, the processor further configured to:

preset, for each device, a power consumption pattern indicative of a time series of power consumption at a time of abnormality;

identify a device corresponding to the monitored time series of power consumption based on the power consumption pattern; and restart the identified device to correct the abnormality.

* * * * *